US008786908B2

(12) United States Patent
Takahashi

(10) Patent No.: US 8,786,908 B2
(45) Date of Patent: Jul. 22, 2014

(54) IMAGE FORMING APPARATUS, METHOD OF CONTROLLING DRAWING PROCESSING, AND RECORDING MEDIUM STORING DRAWING PROCESSING CONTROL PROGRAM

(75) Inventor: Rina Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 136 days.

(21) Appl. No.: 13/444,232

(22) Filed: Apr. 11, 2012

(65) Prior Publication Data

US 2012/0268796 A1 Oct. 25, 2012

(30) Foreign Application Priority Data

Apr. 22, 2011 (JP) ................................ 2011-096294

(51) Int. Cl.
*H04N 1/405* (2006.01)
*G06K 15/00* (2006.01)

(52) U.S. Cl.
USPC ......................... 358/3.13; 358/1.16; 358/3.22

(58) Field of Classification Search
USPC ...................... 358/1.1, 1.3, 1.4, 1.5, 1.6, 1.9, 358/1.11–1.18, 530
See application file for complete search history.

(56) References Cited

U.S. PATENT DOCUMENTS 7,715,031 B2 * 5/2010 Westervelt et al. .......... 358/1.15
2012/0086970 A1 4/2012 Takahashi

FOREIGN PATENT DOCUMENTS

JP 2004243569 A 9/2004
JP 2010220075 A 9/2010

* cited by examiner

*Primary Examiner* — Barbara Reinier
(74) *Attorney, Agent, or Firm* — Harness, Dickey & Pierce, P.L.C.

(57) ABSTRACT

An image forming apparatus provided with a first drawing processor and a second drawing processor, includes a converter to convert a data format of drawing processing data from a data format suitable for the first drawing processor to a data format suitable for the second drawing processor, and a process allocator to control drawing processing based on a processing load on the converter.

12 Claims, 4 Drawing Sheets

IMAGE FORMING APPARATUS, METHOD OF CONTROLLING DRAWING PROCESSING, AND RECORDING MEDIUM STORING DRAWING PROCESSING CONTROL PROGRAM

CROSS-REFERENCE TO RELATED APPLICATIONS

This patent application is based on and claims priority pursuant to 35 U.S.C. §119 to Japanese Patent Application No. 2011-096294, filed on Apr. 22, 2011, in the Japan Patent Office, the entire disclosure of which is hereby incorporated by reference.

BACKGROUND

1. Field

The present invention relates to an image forming apparatus and a method of controlling drawing processing to generate image data for print output, and more specifically to an image forming apparatus, a method of controlling drawing processing to be performed by a drawing processor selected from a plurality of types of drawing processors to generate image data for print output, and a recording medium storing a drawing processing control program.

2. Background

The image forming apparatus such as a printer processes print data into image data for print output according to drawing commands of the print data, and forms an image based on the image data on a recording sheet. This processing, which may be referred to as drawing processing or rendering processing, is performed by a drawing processor according to the drawing commands, which may be written in a page description language (PDL). In order to improve efficiency in drawing processing, the recent image forming apparatus may be provided with a hardware drawing processor implemented by a specialized electronic circuit, in addition to a software drawing processor implemented by a central processing unit (CPU). In such case, drawing processing may be shared between the hardware drawing processor and the software drawing processor in a manner such that overall efficiency in drawing processing is improved.

SUMMARY

While the hardware drawing processor is capable of performing drawing processing with an efficiency higher than that of the software drawing processor, overall efficiency in drawing processing may not always increase by simply causing the hardware drawing processor to perform drawing processing in alternative to the software drawing processor. For example, since a cache function is usually provided to the software drawing processor, data designed for drawing processing by the software drawing processor is most likely to have a data format suitable for the drawing processor having the cache function. If the hardware drawing processor without a cache function is selected to perform drawing processing using such data designed for the drawing processor having the cache function, the hardware drawing processor may need to access such data repeatedly, thus reducing overall efficiency in drawing processing.

In view of the above, one aspect of the present invention is to provide an apparatus and method of controlling drawing processing to be performed by a drawing processor selected from a plurality of types of drawing processors, while taking into account a data format of data to be used for drawing processing by the selected drawing processor.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
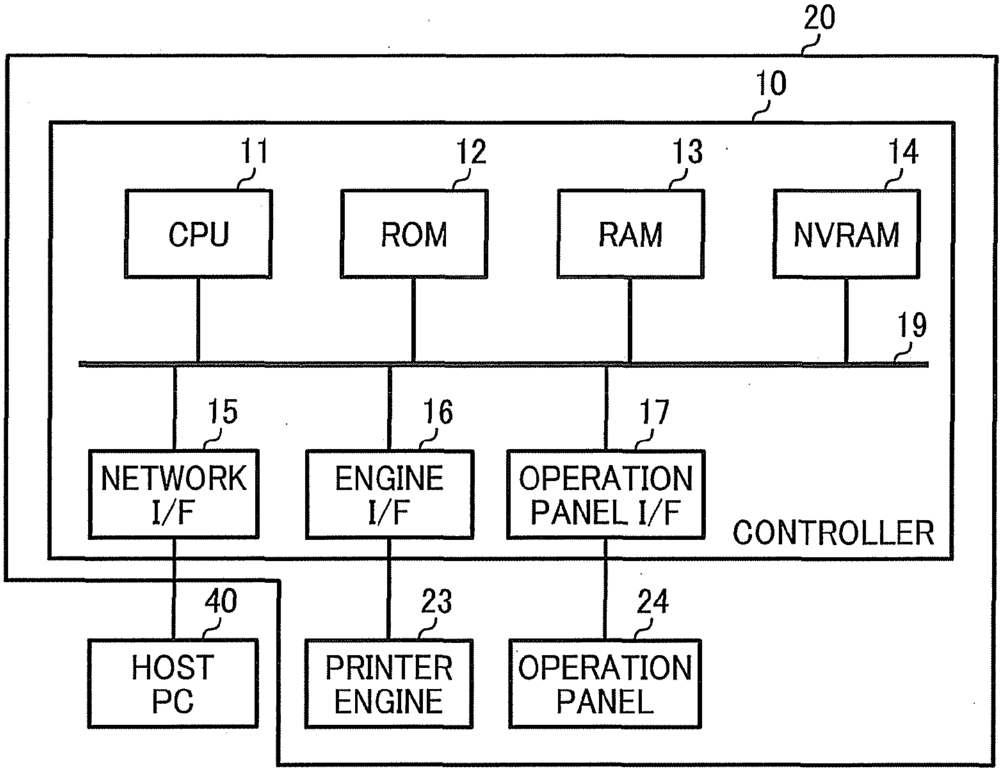
FIG. 1 is a schematic block diagram illustrating a hardware structure of an image forming apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the tells "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following examples, the image forming apparatus is implemented by a printer, which receives print data from a host apparatus and causes a printer engine to form an image on a recording sheet based on image data generated from the print data. While the printer in the following examples is a color printer, any desired printer such as a monochrome printer may be used. Further, the printer is provided with a hardware drawing processor and a software drawing processor, and an additional component that allows the printer to effectively select or use the hardware drawing processor or the software drawing processor to improve efficiency in drawing processing. The additional component includes a converter that converts a data format of data to be used for drawing processing from a data format that is suitable for the software drawing processor to a data format that is suitable for the hardware drawing processor, so as to improve efficiency in processing by the hardware drawing processor. The additional component may further include a function of selecting the software drawing processor or the hardware drawing processor as a drawing processor to perform drawing processing, and/or a function of determining whether to perform conversion of a data format of data to be used for drawing processing before performing drawing processing by the hardware drawing processor. The additional component may further include a function of estimating a processing load on the converter in converting the data format of the data to be used for drawing processing.

(Hardware Structure)

FIG. 1 is a schematic block diagram illustrating a hardware structure of a printer 20 according to an example embodiment of the present invention. The printer 20 mainly includes a controller 10, a printer engine 23, and an operation panel 24. The controller 10 controls entire operation of the printer 20. The printer engine 23 forms an image on a recording sheet based on image data processed by the controller 10. The operation panel 24, which functions as a user interface that interacts with a user, includes a display that outputs information indicating a status of the printer 20 to the user, and an input device that allows the user to input a user instruction through one or more keys. For example, the operation panel 24 may be implemented by a touch panel screen.

The controller 10 includes a central processing unit (CPU) 11, a read only memory (ROM) 12, a random access memory (RAM) 13, and a nonvolatile RAM (NVRAM) 14. The CPU 11 executes various commands or instructions according to a control program such as a drawing processing control program. The ROM 12 stores therein the control program for execution by the CPU 11 such as the drawing processing control program, and various control data to be used by the CPU 11 in executing the control program. The RAM 13 functions as a work memory for execution of the control program, or a page or frame memory that temporarily stores image data that is generated by the CPU 11 using the control program. The NVRAM 14 stores therein settings data specific to the printer 20 such as settings data relating to processing or printing conditions.

The controller 10 further includes an engine interface (I/F) 16, an operation panel I/F 17, and a network I/F 15. The engine I/F 16 allows the controller 10 to exchange data with the printer engine 23. The operation panel I/F 17 allows the controller 10 to exchange data with the operation panel 24. The network I/F 15 allows the controller 10 to exchange data with a host personal computer (PC) 40 through a network. The network may be any wired or wireless network such as a local area network (LAN).

The host PC 40 is a general-purpose computer provided with an operating system (OS) and various application programs. In this example, the host PC 40 is provided with a printer driver, which generates print data to be printed, and sends the print data to the printer 20 through the network.

The above-described devices or units of the controller 10 are connected or coupled with one another through an internal bus 19.

In printing operation, the controller 10 performs drawing processing, or rendering processing, using print data that is received from the host PC 40 to generate image data for print output, and causes the printer engine 23 to form an image on a recording sheet based on the image data. The RAM 13 stores various image data such as the print data received from the host PC 40, intermediate data generated from the print data, pixel data of raster format, and the image data to be printed by the printer engine 23.

Figure 2:
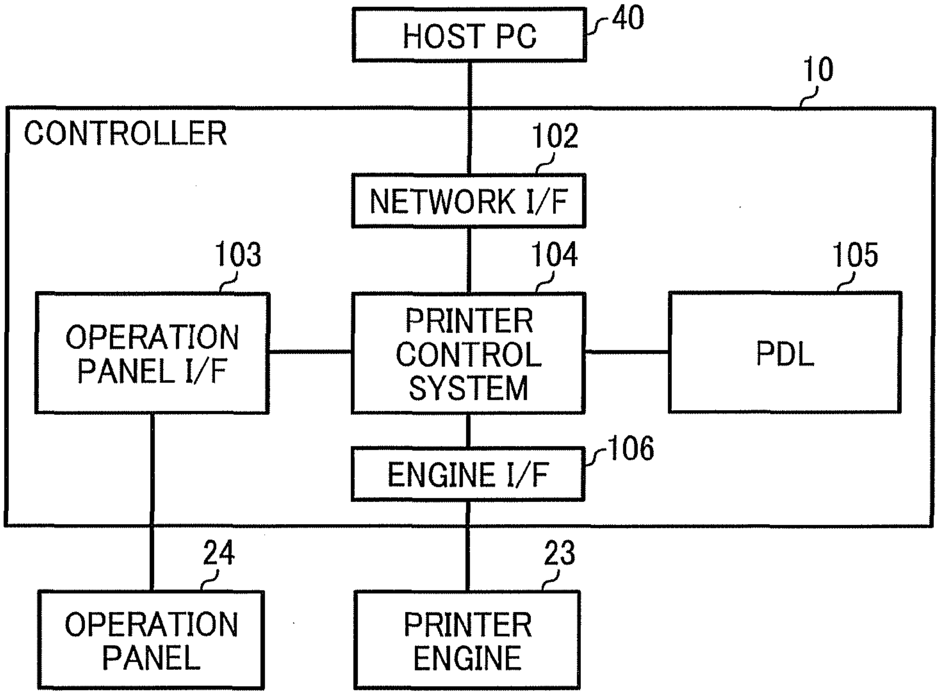
FIG. 2 is a schematic block diagram illustrating a software structure of a controller of the image forming apparatus of FIG. 1, according to an example embodiment of the present invention.
Figure 3:
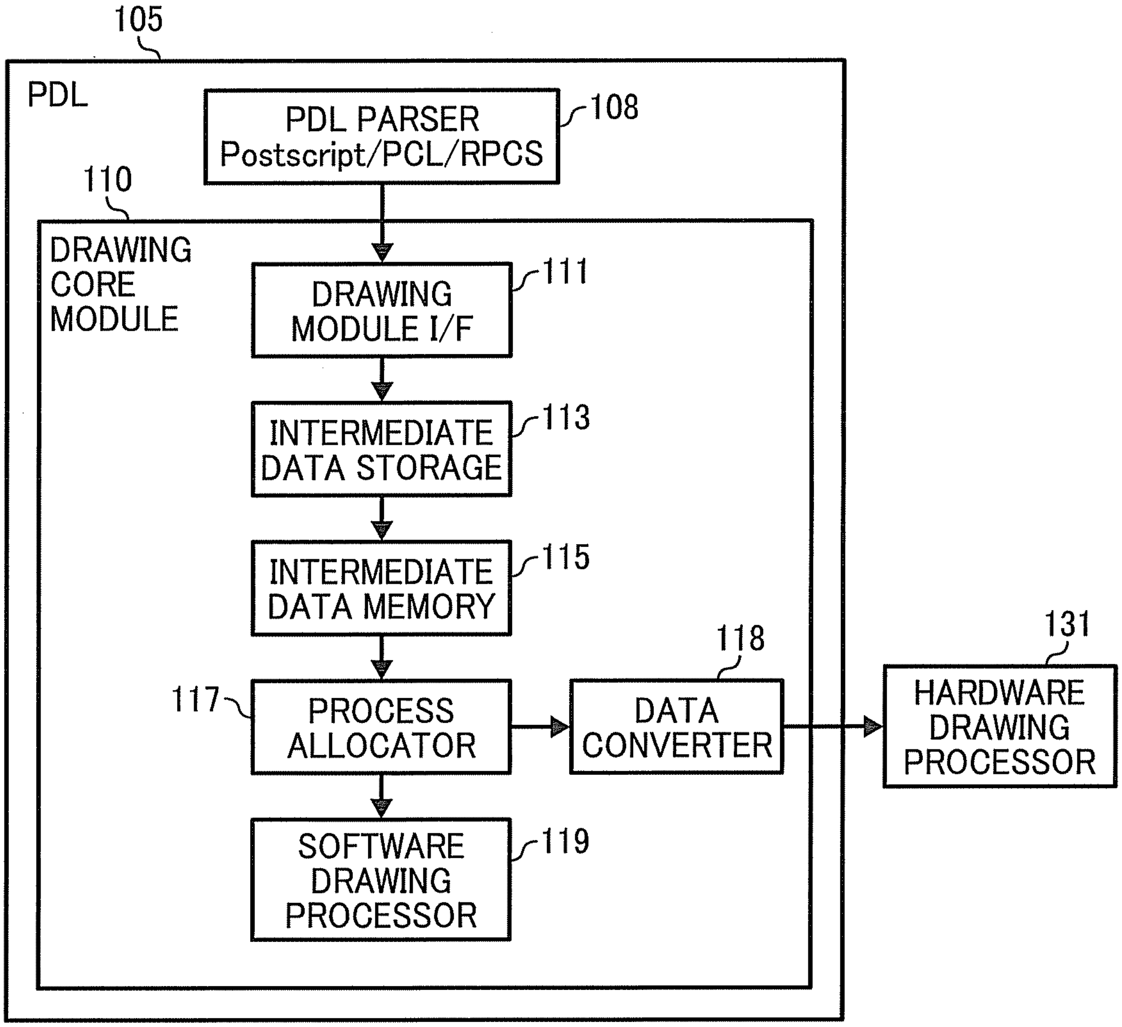
FIG. 3 is a schematic block diagram illustrating a structure of a PDL of FIG. 2.

In drawing processing operation, the CPU 11 reads out the control program and various settings data relating to drawing processing control operation from the ROM 12 and the NVRAM 14, and deploys the read data onto a memory area of the RAM 13 that functions as the work memory to cause the controller 10 to have a functional or software structure as illustrated in FIGS. 2 and 3.

(Software Structure)

FIG. 2 is a schematic block diagram illustrating a software structure of the controller 10 of FIG. 1, when the drawing processing control program is executed.

The printer driver of the host PC 40 converts a document that is created or processed by the application program installed onto the host PC 40, to print data with drawing commands. The host PC 20 further transmits the print data to the printer 20 to request the printer 20 to print the print data according to the drawing commands. The drawing commands specify drawing of a character, an image, a graphical image, etc. The drawing commands of the print data are described using any desired page description language (PDL) such as PostScript, portable document format (PDF), printer control language (PCL), or RPDL.

Referring to FIG. 2, the controller 10 includes a printer control system 104, which is a functional block that controls entire operation of the controller 10. The controller 10 further includes a plurality of modules including a network interface (I/F) 102, an operation panel I/F 103, a page description language (PDL) 105, and an engine I/F 106, each of which operates under the printer control system 104. The network I/F 102 exchanges data with the host PC 40 through the network. For example, the network I/F 102 receives the print data from the host PC 40. The operation panel I/F 103 exchanges data with the operation panel 24 to cause the operation panel 24 to display information to the user or receive a user instruction through the operation panel 24. The PDL 105 analyzes the print data received from the host PC 40 to obtain the drawing commands specifying drawing conditions as an analysis result, and performs drawing processing according to the drawing conditions specified by the drawing commands to generate image data for print output. The engine I/F 106 transmits the image data for print output and various print settings data specifying printing conditions to the printer engine 23 to instruct the printer engine 23 to output a printed image based on the image data and the printing conditions.

The printer control system 104 manages one or more printing jobs to be processed by the printer 20 such that the printer engine 23 forms an image based on the image data according to specific printing conditions. The printer control system 104 manages a current status of the printer 20 in processing the print data for each printing job. For example, when the printing conditions are changed, the printer control system 104 determines whether notification to the user is needed, and sends notification to the user when it is needed. More specifically, when the printer control system 104 detects an error or any event that is not intended by the user instruction, the printer control system 104 sends notification to the user through displaying a message on the display of the operation panel 24 or sending a message to the host PC.

<Internal Structure of PDL>

The PDL 105, which operates under control of the printer control system 104 of the controller 10, performs drawing processing based on the print data to generate image data for print output. In this example, the PDL 105 is provided with the additional component so as to improve efficiency in processing by a selected one of a hardware drawing processor 131 and a software drawing processor 119. In this example, the additional component includes a data converter 118 that converts data to be used for drawing processing ("drawing processing data") from a data format that is suitable for the software drawing processor 119 to a data format that is suitable for the hardware drawing processor 131. The additional component further includes a function of selecting the hardware drawing processor 131 or the software drawing processor 119 to cause the selected drawing processor to perform drawing processing, and/or a function of determining whether conversion by the data converter 118 is to be applied to the drawing processing data before causing the hardware drawing processor 131 to perform drawing processing using the drawing processing data.

FIG. 3 illustrates an internal module structure of the PDL 105 of FIG. 2. As illustrated in FIG. 3, the PDL 105 includes a PDL parser 108 and a drawing core module 110. The PDL parser 108 analyzes syntax of the print data, which is transmitted from the host PC 40. For example, the PDL parser 108 analyzes syntax of the drawing commands that are described in PDL, by PDL type, to obtain drawing conditions. The drawing core module 110 generates image data for print output, according to the drawing conditions obtained as an analysis result of the PDL parser 108.

The drawing core module 110 includes a drawing module interface (I/F) 111, an intermediate data storage 113, an intermediate data memory 115, a process allocator 117, the data converter 118, and the software drawing processor 119. The drawing module I/F 111 receives various drawing commands that specify the drawing conditions obtained by the PDL parser 108, and drawing settings data. The drawing commands include, for example, a command for rendering a text, a command for rendering an image, and a command for rendering a vector graphics. The drawing settings data specifies colors or transparency of the text, image or vector graphics. The intermediate data storage 113 stores the drawing commands for text, image, or vector graphics, and the drawing settings data, in the intermediate data memory 115, as intermediate data.

The process allocator 117 selects one of the software drawing processor 119 and the hardware drawing processor 131, and causes the selected one of the software drawing processor 119 and the hardware drawing processor 131 to process a specific area of the print data subjected for drawing processing. The data converter 118 converts a data format of data to be used for drawing processing to a data format suitable for the hardware drawing processor 131.

The software drawing processor 119 performs drawing processing on the allocated area of the print data using software. The software drawing processor 119 is implemented by the CPU 11 of the image forming apparatus 20. More specifically, the software drawing processor 119 renders the image data for print output, based on the drawing data, i.e., the intermediate data, which is obtained from the print data and stored in the intermediate data memory 115. The software drawing processor 119 may include any desired number of drawing processors.

In addition to the software drawing processor 119, the printer 20 is provided with the hardware drawing processor 131. The hardware drawing processor 131 is a specialized electronic circuit designed to accelerate the building of images for output, such as a graphic accelerator or a graphics processing unit (GPU). The hardware drawing processor 131 performs drawing processing on the allocated area of the print data using hardware such as an integrated circuit. The hardware drawing processor 131 may include any desired number of drawing processors.

Through allocating a specific area of the print data to the software drawing processor 119 or the hardware drawing processor 131, drawing processing can be performed more efficiently while reducing the processing time. For example, drawing processing on a specific area of the print data may be performed by a selected one of the software drawing processor 119 and the hardware drawing processor 131, which is capable of processing the specific area of the print data with higher efficiency. In this manner, drawing processing on the print data may be concurrently performed by the software drawing processor 119 and the hardware drawing processor 131.

In order to further improve efficiency in drawing processing, the data converter 118 is additionally provided to convert drawing processing data to be used for drawing processing from a data format that is suitable for the software drawing processor 119 to a data format that is suitable for the hardware drawing processor 131. For example, the hardware drawing processor 131 may not be provided with a function that is provided by the software drawing processor 119. In such case, even if the area of the print data is allocated to the hardware drawing processor 131, the overall efficiency in processing the print data may be lowered. By converting the drawing processing data in a data format suitable for the hardware drawing processor 131, the processing efficiency is kept high.

On the other hand, since conversion to be performed by the data converter 118 increases the processing load, whether to allocate a specific area of the print data to the hardware drawing processor 131 needs to be determined while taking into account this conversion process. More specifically, the process allocator 117 estimates the processing load on the data converter 118, which depends on the area of the print data to be processed or specific processing to be performed, for example. The process allocator 117 determines whether to use the hardware drawing processor 131, based on the estimated processing load on the data converter 118 and estimated merits in using the hardware drawing processor 131. For example, if the processing load is so high such that is cancels out the merits of using the hardware drawing processor 131, the process allocator 117 determines not to use the hardware drawing processor 131, but allocates the area of the print data to the software drawing processor 119. In another example, if the processing load is not so high such that the merits of using the hardware drawing processor 131 tends to be great, the process allocator 117 determines to use the hardware drawing processor 131, and allocates the area of the print data to the hardware drawing processor 131.

Alternatively or additionally, the process allocator 117 may determine whether to perform conversion processing by the data converter 118, based on the estimated processing load on the data converter 118. More specifically, the process allocator 117 estimates the processing load on the data converter 118, which depends on the specific area of the print data to be processed or specific type of processing to be performed, for example. The process allocator 117 determines whether to perform data conversion, based on the estimated processing load on the data converter 118 and estimated merits in using the hardware drawing processor 131 after performing data conversion. For example, if the processing load is so high such that it cancels out the merits of performing data conversion, the process allocator 117 determines not to perform data conversion by the data converter 118 such that the hardware drawing processor 131 performs drawing processing using the non-converted drawing processing data. In another example, if the processing load is not so high such that the merits of performing data conversion tends to be great, the process allocator 117 determines to perform data conversion by the data converter 118 such that the hardware drawing processor 131 performs drawing processing using the converted drawing processing data.

In the above-described case in determining whether to perform data conversion, the process allocator 117 may determine that the specific area of the print data is subjected for drawing processing by the hardware drawing processor 131, whether or not the merits in using the hardware drawing processor 131 is high or low relative to the processing load on the data converter 118. For example, the hardware drawing processor 131 may be previously set to perform drawing processing.

As described above, the process allocator 117 estimates a processing load on the data converter 118 in converting a data format of drawing processing data. Based on the estimated processing load, the process allocator 117 is able to control specific drawing processing to be performed by the software drawing processor 119 or the hardware drawing processor 131. In one example, the process allocator 117 selects the software drawing processor 119 or the hardware drawing processor 131 based on the estimated processing load, and causes the selected one of the drawing processor to perform drawing processing so as to increase the efficiency in drawing processing. In another example, the process allocator 117 determines whether to perform conversion of drawing processing data based on the processing load on the data converter 118, and causes the hardware drawing processor 131 to perform drawing processing using the converted drawing processing data or non-converted drawing processing data so as to increase the efficiency in drawing processing.

In this example, the drawing processing data to be used for drawing processing by the selected drawing processor may be any desired data such as data to be used for dithering. For example, in drawing processing, the intermediate data storage 113 selects a dither pattern to be used for a specific area of the print data to be processed, according to drawing conditions. The drawing conditions are defined by drawing commands for texts, image, or vector graphics, commands for setting colors, and commands for setting a resolution of a page or a bit depth, which may be received from the drawing module I/F 111. The data to be used for the selected dither pattern is sent to the software drawing processor 119 or the hardware drawing processor 131 through the process allocator 117. The data to be used for the selected dither pattern is previously determined for each one of a plurality of types of dither patterns, and is previously stored in the ROM 12. When the controller 10 is executed, the PDL parser 108 obtains the data to be used for the selected dither pattern from the ROM 12 for use by the PDL 105.

(Converting Data for Drawing Processing)

Now, operation of converting drawing processing data to be used for drawing processing, performed by the data converter 118, is explained according to an example embodiment of the present invention.

Assuming that the hardware drawing processor 131 is used to perform drawing processing in alternative to the software drawing processor 119, processing efficiency in performing drawing processing may not be fully optimized if the print data having a data format suitable for the software drawing processor 119 is used. For this reasons, in this example, the data converter 118 converts a data format of the drawing processing data to a format that is suitable for the hardware drawing processor 119, thus improving the processing efficiency.

For example, if the hardware drawing processor 131 is not provided with a cache function that is provided to the software drawing processor 119, the efficiency in processing the print data may be lowered if the hardware drawing processor 131 without the cache function is used. In order to suppress the processing efficiency from being lowered, the data converter 118 converts the drawing processing data from a data format suitable for the software drawing processor 119 to a data format suitable for the hardware drawing processor 131.

Figure 4:
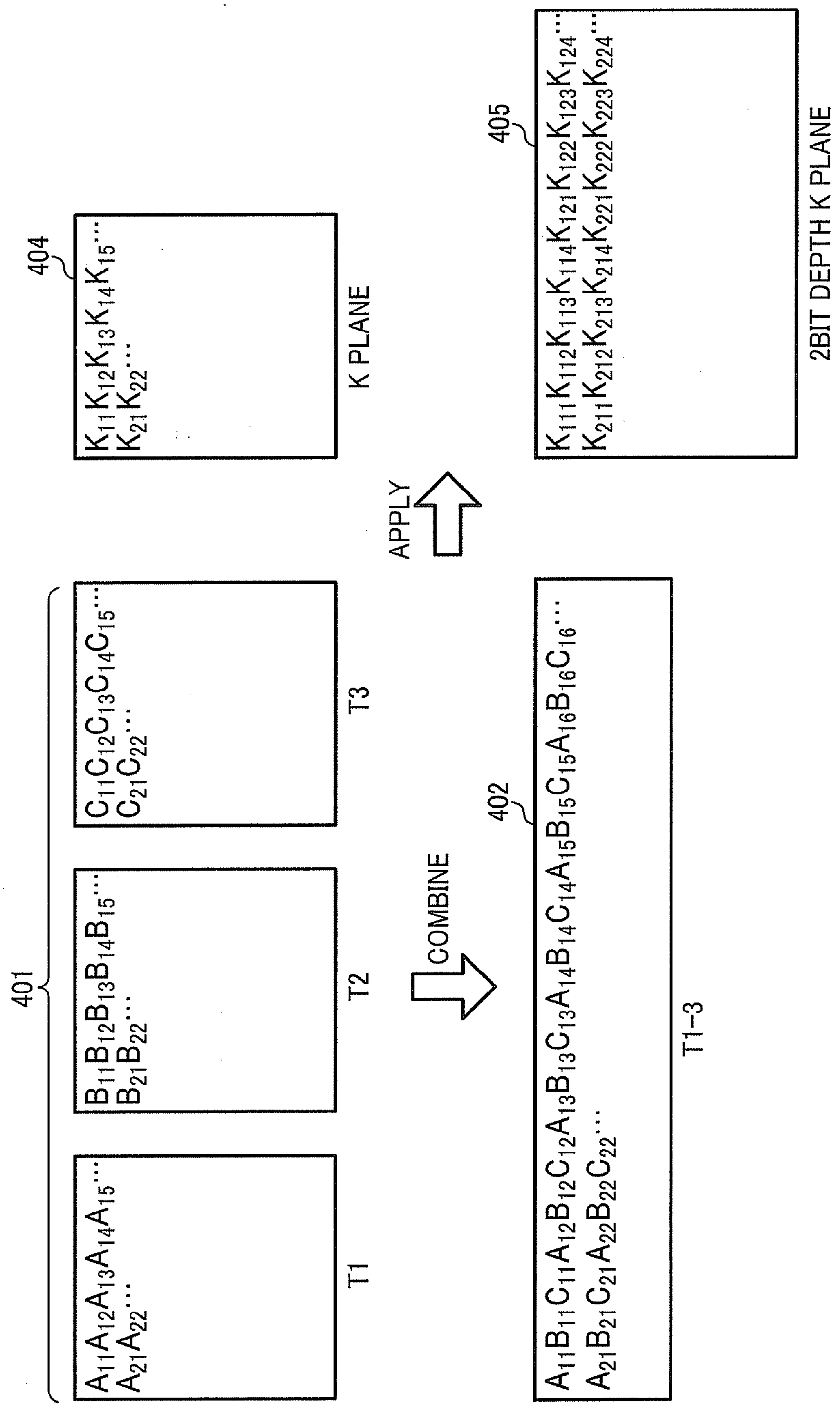
FIG. 4 is an illustration for explaining converting a data format of threshold data to be used for dithering from a data format suitable for a software drawing processor to a data format suitable for a hardware drawing processor, according to an example embodiment of the present invention.

Referring now to FIG. 4, operation of converting a data format of drawing processing data to be used for drawing processing is explained according to an example embodiment of the present invention. In this example illustrated in FIG. 4, operation of converting a data format of threshold data indicating a plurality of threshold values used for dithering is explained according to an example embodiment of the present invention.

In drawing a full-color image according to drawing conditions specified by various drawing commands of print data, thresholding may be applied to each pixel in the print data to generate a dithering pattern. For example, in case of processing color print data of four colors, an 8-bit pixel value of each color is dithered into, for example, a 2-bit pixel value of each color. In such case, three threshold values are needed for each pixel to perform dithering by the drawing processor. As illustrated in FIG. 4, a plurality of threshold values, which respectively correspond to the pixels of the print data arranged in order, is provided to the drawing processor, as threshold data having a predetermined format.

Referring to FIG. 4, the threshold data 401 includes first threshold data T1, second threshold data T2, and third threshold data T3, each having a predetermined data format such that each threshold data includes a plurality of threshold values respectively corresponding to the pixels of the print data arranged in order. More specifically, the first threshold data T1 includes a plurality of first threshold values A11, A12, A13, . . . corresponding to the pixels arranged in a first line of the print data, a plurality of first threshold values A21, A22, A23, . . . corresponding to the pixels arranged in a second line of the print data, etc. The second threshold data T2 includes a plurality of second threshold values B11, B12, B13 . . . corresponding to the pixels arranged in the first line of the print data, a plurality of second threshold values B21, B22, B23, . . . corresponding to the pixels arranged in the second line of the print data, etc. The third threshold data T3 includes a plurality of third threshold values C11, C12, C13 . . . corresponding to the pixels arranged in the first line of the print data, a plurality of third threshold values C21, C22, C23, . . . corresponding to the pixels arranged in the second line of the print data, etc. The threshold values of the threshold data T1, T2, or T3 are determined based on a type of dithering. In case the same type of dithering is applied to a plurality of pages, the threshold values of the threshold data T1, T2, and T3 are applied to each page, repeatedly.

As illustrated in FIG. 4, when the first threshold data T1, the second threshold data T2, and the third threshold data T3 are managed in separate data files, these data files are stored in respective memory areas. To draw a dithering pattern, the drawing processor accesses the memory area storing the first threshold data T1, the memory area storing the second threshold data T2, and the memory area storing the third threshold data T2, respectively, and applies thresholding to each pixel of each color in the print data using the threshold value to obtain binarized data 404. Based on the binarized data 404, the drawing processor generates a 2-bit dithering pattern for each color plane of the print data. Accordingly, the drawing processor is required to access a total of three different memory areas to draw a dithering pattern of one page. In case the same dithering is used for more than one page, if the software drawing processor provided with the cache function is used for drawing processing, accessing the memory area is not required as long as the threshold values are kept stored using the cache function. In case the hardware drawing processor without the cache function is used, the drawing processor needs to access the respective memory areas to obtain the threshold values for each page to be processed, thus lowering the processing efficiency.

In view of the above, in this example, the first threshold data T1, the second threshold data T2, and the third threshold data T3 are combined into threshold data 402 having a predetermined data format. The threshold data 402 includes a plurality of sets of threshold values, with each set including first, second, and third threshold values corresponding to a plurality of pixels in the print data. The threshold data 402 includes threshold values A11, B11, and C11 for a first pixel in a first line, threshold values A12, B12, and C12 for a second pixel in the first line, etc., threshold values A21, B21, C21 for a first pixel in a second line, threshold values A22, B22, C22 for a second pixel in the second line, etc.

Since the threshold data 402, which is generated by integrating the threshold data T1 to T3, is stored in a predetermined memory area, the drawing processor only needs to access one time to obtain three threshold values to generate a 2-bit dithering pattern.

FIG. 4 illustrates a 2-bit K plane 405, which is a dithering pattern of pixels in a black (K) plane of the print data. The 2-bit K plane 405 includes pixels K111, K112, K113, and K114 for a first pixel in a first line of the print data, pixels K121, K122, K123, and K124 for a second pixel in the first line of the print data, pixels K211, K212, K213, and K214 for a first line of a second line of the print data, and pixels K221, K222, K223, and K224 for a second line of the second line of the print data, etc.

As described above, as a plurality of threshold values used for dithering can be obtained from one integrated data, the drawing processor only needs to access a memory area once to obtain such data. Even when the same dithering pattern is repeatedly applied to a plurality of pages, the hardware drawing processor without the cache function only needs to access the memory area to obtain a plurality of threshold values to generate a dithering pattern, thus improving efficiency in drawing processing.

While converting a data format of drawing processing data allows the hardware drawing processor 131 to perform drawing processing with improved efficiency, it is preferable to take into account the processing load on the data converter 118 in converting the data. In one example, as described below referring to FIG. 5, the process allocator 117 selects the software drawing processor 119 or the hardware drawing processor 131 based on the processing load on the data converter 118 with respect to merits in performing the hardware drawing processor 131. In another example, as described below referring to FIG. 6, the process allocator 117 determines whether to convert drawing processing data by the hardware drawing processor 131, based on the processing load on the data converter 118 with respect to merits in performing data conversion.

EXAMPLE 1

In this example, the process allocator 117 estimates a processing load on the data converter 118 in converting a data format of drawing processing data, which is referred to as a conversion cost. When the process allocator 117 determines that merits of using the hardware drawing processor 131 is high even after taking into account the conversion cost, the process allocator 117 determines to use the hardware drawing processor 131. When the process allocator 117 determines that the conversion cost is too high such that there are no or little merits of using the hardware drawing processor 131, the process allocator 117 determines that the software drawing processor 119 is used. The conversion cost of the data converter 118 may be estimated based on a number of times the data converter 118 requires to convert a data format of the drawing processing data to obtain a data format suitable for the hardware drawing processor 131, per a predetermined unit of drawing processing. The unit of drawing processing may be set to one page of the print data.

In order to determine whether the conversion cost is high or low relative to the merits in causing the hardware drawing processor to perform drawing processing using the converted data, the conversion cost is compared to a reference conversion cost, which is a predetermined reference number of data conversions. The conversion cost, or a number of data conversions to be applied, is compared with the reference conversion cost. When it is determined that the estimated conversion cost is within a range defined by the reference conversion cost, the process allocator 117 causes the hardware drawing processor 131 to perform drawing processing using the drawing processing data, which has a data format converted by the data converter 118.

The reference number of data conversions is a number of data conversions that can be applied by the data converter 118, which results in improved processing efficiency by the hardware drawing processor 131. The reference number of data conversions is determined based on a machine-specific empirical data that is obtained by experiments. For example, a number of data conversion that is applied to the drawing processing data to have a data format suitable for the hardware drawing processor 131, and the improved processing efficiency that is obtained through performing drawing processing by the hardware drawing processor 131 using the converted drawing processing data may be obtained. The improved processing efficiency may be obtained based on, for example, the processing time required for completing drawing processing, the processing load on the hardware drawing processor 131 such as a number of times the hardware drawing processor 131 needs to access a memory area, etc., which may be compared with the processing time or processing load obtained when the software drawing processor 119 is used.

For example, in the example case illustrated in FIG. 4, the data converter 118 performs data conversion one time per one page to generate the threshold data 402, which integrates the threshold data T1, T2, and T3. Since the conversion cost, or a number of data conversions to be applied, is one per one page, the conversion cost is determined to be low compared with the reference conversion cost, which is set higher than one per one page.

Figure 5:
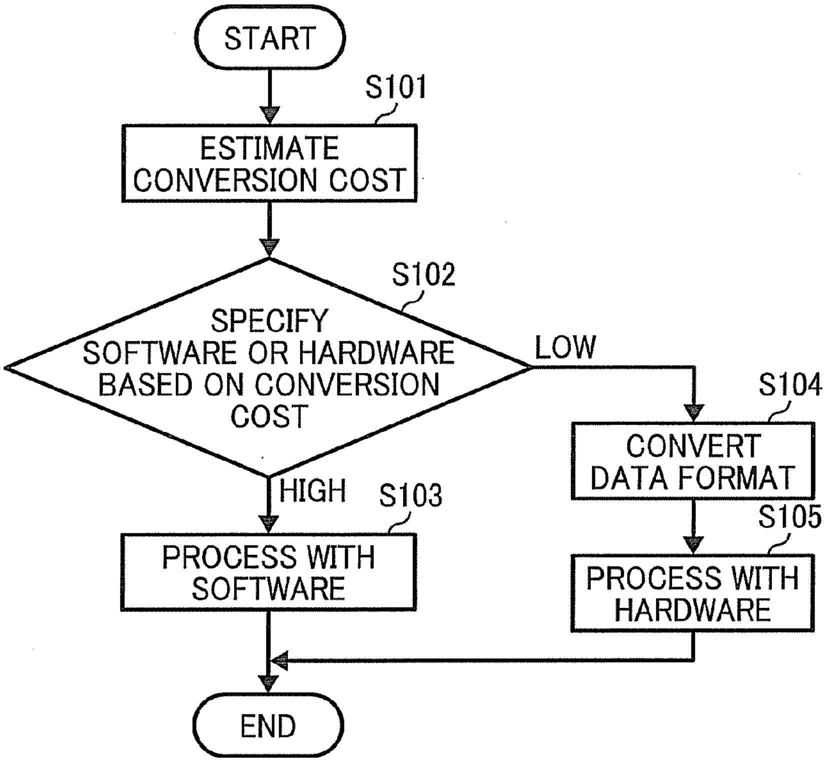
FIG. 5 is a flowchart illustrating operation of selecting the software drawing processor or the hardware drawing processor, performed by the PDL of FIG. 2, according to an example embodiment of the present invention.

Referring to FIG. 5, operation of selecting the software drawing processor 119 or the hardware drawing processor 131 to perform drawing processing, performed by the PDL 105, is explained according to an example embodiment of the present invention. The operation of FIG. 5 is performed when the drawing core module 110 starts drawing processing, or rendering processing, to generate image data for print output, based on drawing data (intermediate data) received from the PDL parser 108.

At S101, the process allocator 117 estimates a conversion cost in converting a data format of drawing processing data, to a data format suitable for the hardware drawing processor 131. For example, the drawing processing data may be threshold data to be used for drawing a dithering pattern as illustrated in FIG. 4. More specifically, the conversion cost may be estimated based on a number of data conversions to be performed when drawing one page of image data.

At S102, the process allocator 117 specifies the software drawing processor 119 or the hardware drawing processor 131 based on the estimated conversion cost. When the conversion cost is not within a range defined by the predetermined reference number of conversions, the process allocator 117 determines that the conversion cost is high ("HIGH" at S102), and the operation proceeds to S103 to cause the software drawing processor to perform drawing processing. When the estimated conversion cost, which is an estimated number of data conversions, is within a range defined by the predetermined reference number of conversions, the process allocator 117 determines that the conversion cost is low ("LOW" at S102), and the operation proceeds to S104 to cause the data converter 118 to perform data conversion. The reference number of conversions is previously determined as a number of data conversions that still results in high processing efficiency of the hardware drawing processor 131.

At S104, the data converter 118 converts a data format of the drawing processing data, which is set specifically for each drawing area of the drawing data, to a data format suitable for the hardware drawing processor 131.

At S105, the hardware drawing processor 131 applies drawing processing to the print data using the data for drawing processing having a data format that is converted at S104, and the operation ends.

As described above, the process allocator 117 selects the software drawing processor 119 or the hardware drawing processor 131 based on determination whether the conversion cost in converting drawing processing data is high or low. Since the conversion cost is taken into account, the process allocator 117 is able to select the hardware drawing processor 131 when the use of hardware drawing processor 131 contributes to the improved efficiency in drawing processing.

EXAMPLE 2

In another example, the process allocator 117 firstly selects the software drawing processor 119 or the hardware drawing processor 131 as the drawing processing that performs drawing processing on a specific area of the print data. When the hardware drawing processor 131 is selected, the process allocator 117 estimates a conversion cost indicating the processing load on the data converter 118 in converting drawing processing data that is set for the specific area of the print data. When the process allocator 117 determines that the merits of using the converted data is high while taking into account the conversion cost, the process allocator 117 causes the data converter 118 to convert the data for drawing processing to a data format suitable for the hardware drawing processor 131. When the process allocator 117 determines that the conversion cost is so high such that there are no or little merits of using the converted data, the process allocator 117 does not cause the data converter 118 to convert the data for drawing processing such that the hardware drawing processor 131 performs drawing processing using non-converted data. The conversion cost indicating the processing load on the data converter 118 may be estimated, for example, based on a number of times the drawing processing data is applied with data conversion to generate the drawing processing data having a data format suitable for the hardware drawing processor 131 for a predetermined unit of drawing processing. For example, the predetermined unit may be set to one page of print data.

In order to determine whether the conversion cost is high or low relative to the merits of causing the hardware drawing processor 131 to use the converted drawing processing data, the conversion cost, or a number of data conversions to be applied, is compared with a reference conversion cost, which is a predetermined reference number of data conversions. When it is determined that the estimated conversion cost is within a range defined by the reference conversion cost, the process allocator 117 causes the data converter 118 to perform data conversion.

The reference number of data conversions is a number of data conversions that can be applied by the data converter 118, which results in improved processing efficiency by the hardware drawing processor 131. The reference number of data conversions is determined based on a machine-specific empirical data that is obtained by experiments. For example, a number of data conversion that is applied to the drawing processing data to have a data format suitable for the hardware drawing processor 131, and the improved processing efficiency that is obtained through performing drawing processing by the hardware drawing processor 131 using the converted drawing processing data may be obtained. The improved processing efficiency may be obtained based on, for example, the processing time required for completing drawing processing, the processing load on the hardware drawing processor 131 such as a number of times the hardware drawing processor 131 needs to access a memory area, etc., which may be compared with the processing time or processing load obtained when the hardware drawing processor 131 performs drawing processing using the non-converted drawing processing data having a data format suitable for the software drawing processor 119.

For example, in the example case illustrated in FIG. 4, the data converter 118 performs data conversion one time per one page to generate the threshold data 402, which integrates the threshold data T1, T2, and T3. Since the conversion cost, or a number of data conversions to be applied, is one per one page, the conversion cost is determined to be low compared with the reference conversion cost, which is set higher than one per one page.

Figure 6:
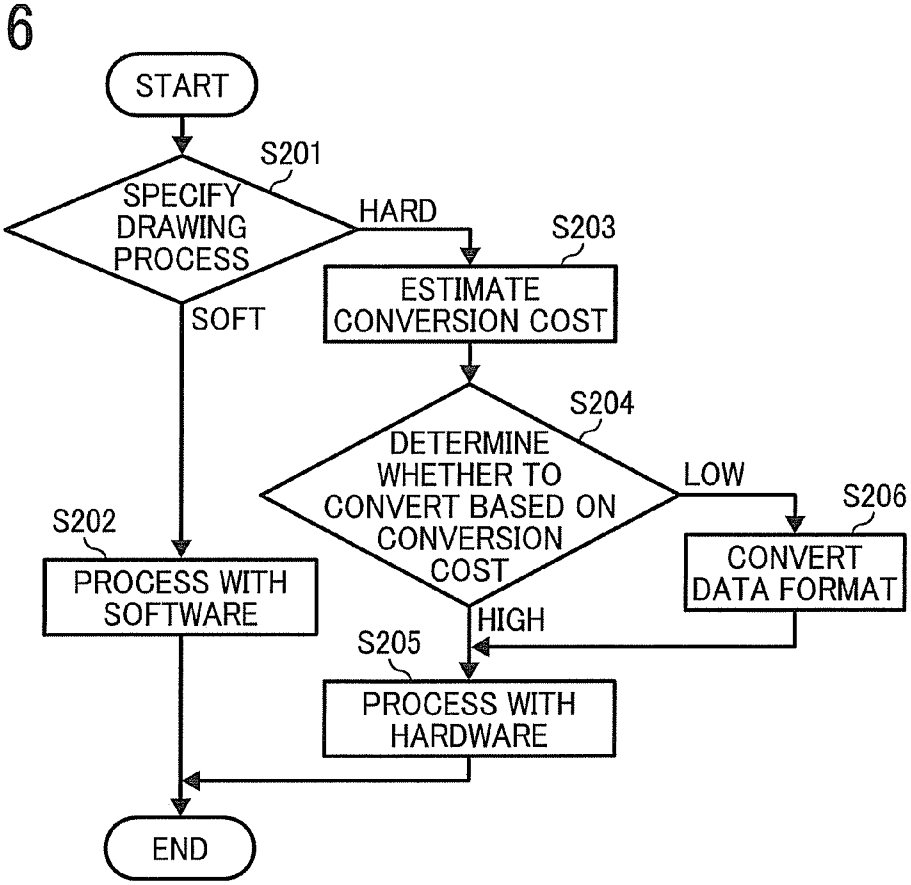
FIG. 6 is a flowchart illustrating operation of determining whether to convert a data format of data to be used for drawing processing before performing drawing processing using the hardware drawing processor, performed by the PDL of FIG. 2, according to an example embodiment of the present invention.

Referring to FIG. 6, operation of determining whether to convert a data format of drawing processing data, performed by the PDL 105, is explained according to an example embodiment of the present invention. The operation of FIG. 6 is performed when the drawing core module 110 starts drawing processing, or rendering processing, to generate image data for print output based on drawing data (intermediate data) received from the PDL parser 108.

At S201, the process allocator 117 determines which one of the software drawing processor and the hardware drawing processor performs drawing processing, based on the drawing data that is received. For example, the process allocator 117 analyzes a type of settings data that is set for the drawing data to be processed to determine which one of the software drawing processor and the hardware drawing processor should be used to perform drawing processing on the drawing data.

When it is determined that the software drawing processor is used ("SOFT" at S201), the operation proceeds to S202 to cause the software drawing processor 119 to perform drawing processing on the drawing data to generate image data for print output.

When it is determined that the hardware drawing processor is used ("HARD" at S201), the operation proceeds to S203. At S203, the process allocator 117 estimates a conversion cost in converting a data format of drawing processing data, to a data format suitable for the hardware drawing processor 131. For example, the drawing processing data may be threshold data to be used for drawing a dithering pattern as illustrated in FIG. 4. More specifically, the conversion cost may be estimated based on a number of data conversions to be performed to generate the drawing processing data having a data format suitable for the hardware drawing processor 131 per one page of the print data.

At S204, the process allocator 117 determines whether conversion of a data format of the drawing processing data is desirable, based on the estimated conversion cost. When the conversion cost is not within a range defined by the predetermined reference number of conversions, the process allocator 117 determines that the conversion cost is high ("HIGH" at S204), and the operation proceeds to S205 to cause the hardware drawing processor 131 to perform drawing processing using non-converted data, and the operation ends. When the estimated conversion cost, which is an estimated number of data conversions, is within a range defined by the predetermined reference number of conversions, the process allocator 117 determines that the conversion cost is low ("LOW" at S206), and the operation proceeds to S206 to cause the data converter 118 to convert the drawing processing data to have a data format suitable for the hardware drawing processor 131. At S206, the hardware drawing processor 131 performs drawing processing using the converted drawing processing data, and the operation ends.

As described above, the process allocator 117 determines whether to convert drawing processing data to be used for drawing processing based on determination whether the conversion cost in converting such data is high or low. Since the conversion cost is taken into account, the process allocator 117 is able to cause the data converter 118 to perform data conversion when the use of the converted data contributes to the improved efficiency in drawing processing.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in an image forming apparatus, which performs drawing processing based on print data to generate image data for print output using a drawing processor selected from a plurality of drawing processors, the plurality of drawing processors including a first drawing processor and a second drawing processor. The image forming apparatus includes: converting means for converting a data format of drawing processing data to be used for drawing processing from a data format suitable for the first drawing processor to a data format suitable for the second drawing processor; and selecting means for selecting the first drawing processor or the second drawing processor to cause the selected one of the first drawing processor and the second drawing processor to perform drawing processing on the print data using the drawing processing data.

For example, the first drawing processor corresponds to a software drawing processor, which may be implemented by a CPU. The second drawing processor corresponds to a hardware drawing processor, which may be implemented by a specialized electronic circuit such as a graphics accelerator. The converting means corresponds to a data format converter, which may be implemented by the CPU. The selecting means corresponds to a process allocator, which may be implemented by the CPU.

The image forming apparatus further includes processing load estimating means for estimating a processing load on the converting means in converting the data format of the drawing processing data. The selecting means selects the first drawing processor or the second drawing processor, based on the estimated processing load on the converting means. For example, the processing load estimating means corresponds to the process allocator, which may be implemented by the CPU.

The processing load estimating means estimates the processing load on the converting means, based on a number of times the drawing processing data is converted per one page of the print data subjected for drawing processing.

The drawing processing data includes data to be used for drawing a dither pattern, which includes a plurality of values corresponding to a plurality of pixels of the print data. For example, the data to be used for drawing a dither pattern may be threshold data including a plurality of threshold values corresponding to the plurality of pixels of the print data that are arranged in order.

The first drawing processor is provided with a cache function, and the second drawing processor is not provided with the cache function.

In one example, the present invention may reside in an image forming apparatus, which performs drawing processing based on print data using drawing processing data to generate image data for print output using a drawing processor selected from a plurality of drawing processors, the plurality of drawing processors including a first drawing processor and a second drawing processor. The image forming apparatus includes: converting means for converting a data format of drawing processing data to be used for drawing processing from a data format suitable for the first drawing processor to a data format suitable for the second drawing processor; and determining means for determining whether to cause the converting means to convert the drawing processing data.

For example, the first drawing processor corresponds to a software drawing processor, which may be implemented by a CPU. The second drawing processor corresponds to a hardware drawing processor, which may be implemented by a specialized electronic circuit such as a graphics accelerator. The converting means corresponds to a data format converter, which may be implemented by the CPU. The determining means corresponds to a process allocator, which may be implemented by the CPU.

The image forming apparatus further includes: processing load estimating means for estimating a processing load on the converting means in converting the data format of the drawing processing data. The determining means determines whether to convert the drawing processing data, based on the estimated processing load on the converting means. For example, the processing load estimating means corresponds to the process allocator, which may be implemented by the CPU.

The processing load estimating means estimates the processing load on the converting means, based on a number of times the drawing processing data is converted per one page of the print data subjected for drawing processing.

The drawing processing data includes data to be used for drawing a dither pattern, which includes a plurality of values corresponding to a plurality of pixels of the print data. For example, the data to be used for drawing a dither pattern may be threshold data including a plurality of threshold values corresponding to the plurality of pixels of the print data that are arranged in order.

The first drawing processor is provided with a cache function, and the second drawing processor is not provided with the cache function.

In one example, the present invention may reside in a drawing processing control method, including: selecting a first drawing processor or a second drawing processor to cause the selected one of the first drawing processor and the second drawing processor to perform drawing processing based on print data using drawing processing data to generate image data for print output; and converting a data format of the drawing processing data from a data format suitable for the first drawing processor to a data format suitable for the second drawing processor, when the second drawing processor is selected.

The drawing processing control method further includes: estimating a processing load in converting the data format of the drawing processing data to have the data format suitable for the second drawing processor, wherein the selecting selects the first drawing processor or the second drawing processor based on the estimated processing load.

In one example, the present invention may reside in a drawing processing control method, including: selecting a first drawing processor or a second drawing processor to cause the selected one of the first drawing processor and the second drawing processor to perform drawing processing based on print data using drawing processing data to generate image data for print output; determining whether to convert the drawing processing data to have a data format suitable for the second drawing processor, when the second drawing processor is selected to perform drawing processing based on the print data using the drawing processing data; and converting a data format of the drawing processing data from a data format suitable for the first drawing processor to the data format suitable for the second drawing processor, when the determining determines to convert the drawing processing data to have the data format suitable for the second drawing processor.

The drawing processing control method further includes estimating a processing load in converting the data format of the drawing processing data to have the data format suitable for the second drawing processor, wherein the determining determines whether to convert the drawing processing data based on the estimated processing load.

As described above, the processing load in converting the drawing processing data is taken into account to control drawing processing.

For example, the process allocator estimates the processing load in converting a data format of the drawing processing data, which may be set for an area subjected for drawing processing, as a conversion cost. When the merits of using the hardware drawing processor is high even after taking into account the conversion cost, the process allocator determines to convert the data format of the drawing processing data, and causes the hardware drawing processor to perform drawing processing using the drawing processing data having the converted format. When the conversion cost is high with respect to the merits of using the hardware drawing processor, the process allocator determines to cause the software drawing processor to perform drawing processing using the drawing processing data having a non-converted format. Since the conversion cost indicating the processing load in converting a data format of drawing processing data is taken into account to select the hardware drawing processor or the software drawing processor, the processing efficiency in drawing processing increases.

In another example, the process allocator estimates the processing load in converting a data format of the drawing processing data, which may be set for an area subjected for drawing processing, as a conversion cost. When the merits of using the converted drawing processing data is high even after taking into account the conversion cost, the process allocator determines to convert the data format of the drawing processing data, and causes the hardware drawing processor to perform drawing processing using the drawing processing data having the converted format. When the merits of using the converted drawing processing data is low after taking into account the conversion cost, the process allocator determines not to convert the data format of the drawing processing data, and causes the hardware drawing processor to perform drawing processing using the drawing processing data having a non-converted format. Since the conversion cost indicating the processing load in converting a data format of drawing processing data is taken into account to determine whether to convert or not convert the drawing processing data, the processing efficiency in drawing processing increases.

In another example, the above-described drawing processing control method may be applicable to an image forming system, which performs drawing processing using at least one of a plurality of drawing processors that are distributed over a network. For example, the present invention may reside in an image forming system including an image forming apparatus having a first drawing processor, and a second drawing processor that is accessible from the image forming apparatus.

In one example, the image forming apparatus includes a converter to convert a data format of drawing processing data from a data format suitable for the first drawing processor to a data format suitable for the second drawing processor; and a process allocator to select the first drawing processor or the second drawing processor to cause the selected one of the first drawing processor and the second drawing processor to perform drawing processing based on at least an area of print data using the drawing processing data. When the second drawing processor is selected, the process allocator causes the second drawing processor to perform drawing processing using the drawing processing data having the data format converted by the converter.

In another example, the image forming apparatus includes: a converter to convert a data format of drawing processing data from a data format suitable for the first drawing processor to a data format suitable for the second drawing processor; and a process allocator to determine whether to cause the converter to convert the drawing processing data to have the data format suitable for the second drawing processor, when the second drawing processor performs drawing processing based on the area of print data using the drawing processing data.

What is claimed is:

1. An image forming apparatus, comprising:

a plurality of drawing processors each of which performs drawing processing on print data using drawing processing data to generate image data for print output, the plurality of drawing processors including a first drawing processor and a second drawing processor, wherein only the first drawing processor of the first and second drawing processors is configured to implement a cache function;

a converter to convert a data format of the drawing processing data from a data format suitable for the first drawing processor to a data format suitable for the second drawing processor; and a process allocator to, select one of the first and second drawing processors for drawing processing based on settings data that is set for drawing data, determine whether to cause the converter to convert the drawing processing data to have the data format suitable for the second drawing processor based on a conversion cost when the second drawing processor is selected to perform drawing processing using the drawing processing data, before the second drawing processor starts performing the drawing processing, wherein the drawing processing data having the data format suitable for the second drawing processor is threshold data having a data format in which a plurality of sets of threshold values for drawing a dither pattern are combined and stored in a memory area, such that the second drawing processor without the cache function is configured to obtain the plurality of sets of threshold values by accessing the memory area at once.

2. The image forming apparatus of claim 1, wherein the process allocator further estimates a processing load on the converter in converting the data format of the drawing processing data to have the data format suitable for the second drawing processor, and uses the estimated processing load as the conversion cost to determine whether to cause the converter to convert the drawing processing data.

3. The image forming apparatus of claim 2, wherein the processing load is estimated based on a total number of data conversions to be applied to the drawing processing data to generate the drawing processing data having the data format suitable for the second drawing processor, per a unit of the print data subjected for drawing processing.

4. The image forming apparatus of claim 1, wherein the drawing processing data includes a plurality of values corresponding to a plurality of pixels of the print data that are arranged in order.

5. The image forming apparatus of claim 3, wherein the unit of the print data subjected for drawing processing is previously set to one page of the print data.

6. The image forming apparatus of claim 3, wherein the processing load includes a number of times the second drawing processor needs to access a memory area.

7. The image forming apparatus of claim 3, wherein the process allocator determines to cause the converter to convert the data format of the drawing processing data for the second drawing processor, when the conversion cost is within a range defined by a reference conversion cost.

8. The image forming apparatus of claim 7, wherein the reference conversion cost is determined based on a first processing load on the second drawing processor that performs the drawing processing using the converted drawing processing data having the data format suitable for the second drawing processor, relative to a second processing load on the second drawing processor that performs drawing processing using the non-converted drawing processing data having the data format suitable for the first drawing processor.

9. A non-transitory recording medium storing a plurality of instructions which, when executed by a processor, cause the processor to perform a drawing processing control method, the method comprising:

selecting a first drawing processor or a second drawing processor to cause the selected one of the first drawing processor and the second drawing processor to perform drawing processing based on at least an area of print data using drawing processing data to generate image data for print output, wherein only the first drawing processor of the first and second drawing processors is configured to implement a cache function;

selecting one of the first and second drawing processors for drawing processing based on settings data that is set for drawing data, determining whether to convert the drawing processing data to have a data format suitable for the second drawing processor based on a conversion cost when the second drawing processor is selected to perform drawing processing using the drawing processing data, before the second drawing processor starts performing the drawing processing, wherein the drawing processing data having the data format suitable for the second drawing processor is threshold data having a data format in which a plurality of sets of threshold values for drawing a dither pattern are combined and stored in a memory area, such that the second drawing processor without the cache function is configured to obtain the plurality of sets of threshold values by accessing the memory area at once; and converting a data format of the drawing processing data from a data format suitable for the first drawing processor to the data format suitable for the second drawing processor, when the determining determines to convert the drawing processing data to have the data format suitable for the second drawing processor.

10. The non-transitory recording medium of claim 9, wherein the drawing processing control method further comprises:

estimating a processing load in converting the data format of the drawing processing data and using the estimated processing load as the conversion cost, wherein the determining determines to convert the drawing processing data based on the conversion cost.

11. The non-transitory recording medium of claim 9, wherein the drawing processing data includes a plurality of values corresponding to a plurality of pixels of the print data that are arranged in order.

12. The non-transitory recording medium of claim 10, wherein the estimating the process load is based on a total number of data conversions to be applied to the drawing processing data to generate the drawing processing data having the data format suitable for the second drawing processor, per a unit of the print data subjected for drawing processing.

* * * * *